June 26, 1951  M. E. DROZ  2,558,425
EQUATION SOLVER
Filed Aug. 21, 1946  4 Sheets—Sheet 1

Inventor
MARCEL E. DROZ

By M. O. Hayes
Attorney

June 26, 1951 M. E. DROZ 2,558,425
EQUATION SOLVER
Filed Aug. 21, 1946 4 Sheets-Sheet 2

Inventor
MARCEL E. DROZ
By M. O. Hayes
Attorney

June 26, 1951 M. E. DROZ 2,558,425
EQUATION SOLVER
Filed Aug. 21, 1946 4 Sheets-Sheet 3

Inventor
MARCEL E. DROZ
By M. C. Hayes
Attorney

June 26, 1951

M. E. DROZ 2,558,425

EQUATION SOLVER

Filed Aug. 21, 1946

Inventor

MARCEL E. DROZ

By M. A. Hayes

Attorney

Patented June 26, 1951

2,558,425

UNITED STATES PATENT OFFICE 2,558,425

EQUATION SOLVER

Marcel E. Droz, Chappaqua, N. Y., assignor to the United States of America as represented by the Secretary of the Navy Application August 21, 1946, Serial No. 692,021

2 Claims. (Cl. 74—1)

This invention relates to mechanical equation solvers and particularly to range and altitude calculators for use with radar operational training equipment.

An object of the invention is to provide a means for obtaining and presenting on an indicator cathode ray tube information concerning the range and bearing of an artificial target.

A feature of the invention is the obtaining of said information from a carriage whose position is varied in accordance with Cartesian coordinates.

A further feature of the invention is the translation of course and speed information manually inserted into the system into motion of a carriage and the subsequent derivation of the aforementioned range and bearing information from the position of said carriage.

In its preferred application the invention is used in conjunction with a radar training set. The invention provides a means to fix accurately the position and motion of a moving artificial target such that the instructor can control the motion with precision and the student observe the accurately reproduced target position on the indicator tube of the training set. Whether a radar set is used to track aircraft from the ground or a ship or whether it is used for bombing or navigational purposes the training problem requires that the simulating voltages be set up and that they solve the same equations. That is, it is necessary to have an instantaneous representation of relative azimuth angle or bearing, elevation angle and slant range between two points either or both of which may be moving. The present invention is a means for obtaining these voltages.

Let us consider first the problem of moving a target over the face of a radar indicator cathode ray tube to simulate a moving target at zero elevation with respect to a fixed land station. For purposes of clarity let us represent the speed of a target A by W, and the course of A with respect to north by $\phi$. The range, $r$ of the target at any time $t$ is then given by:

$$r = \sqrt{\left[X_0 + \int_{t_0}^{t} W \sin \phi \, dt\right]^2 + \left[Y_0 + \int_{t_0}^{t} W \cos \phi \, dt\right]^2}$$

and the bearing of the target with respect to the fixed station by:

$$\theta = \tan^{-1} \frac{X_0 + \int_{t_0}^{t} W \sin \phi \, dt}{Y_0 + \int_{t_0}^{t} W \cos \phi \, dt}$$

where $Y_0$ and $X_0$ are the coordinates of point A at zero time.

The simultaneous solution of these equations gives the angular position of point A as well as its range. If these two quantities are used to control a simulated echo, the correct presentation will be given by the radar indicator tubes.

If the target does not appear at zero altitude, the slant range R and elevation angle are given by:

$$R = \sqrt{r^2 + L^2} = \frac{L}{\sin \epsilon}$$

$$\epsilon = \sin^{-1} \frac{L}{R} = \tan^{-1} \frac{L}{R}$$

where L is the altitude of the target with respect to the fixed station at time $t$.

The solution of these equations may be accomplished by mechanical, electromechanical, or purely electrical means. The herein described device is a mechanical method for solution of the problem.

Such a mechanical solution is achieved by devising a dynamic model on a small scale which actually duplicates the field situation as illustrated in Fig. 6.

The first step consists in breaking the vector W into its components in Cartesian coordinates. Thus the north-south component is $W \cos \phi$ while the east-west component is $W \sin \phi$. This is achieved by a so-called vector splitter, which is illustrated in Fig. 1. It consists of two turntables or disks driven by a motor at a speed which corresponds to the target velocity W. Take-off wheels are mounted at right angles to the disks and moved with a Scotch yoke in such a manner that the take-off wheels may be moved from the center of the disk to any position toward the periphery. At the maximum radial distance, the speed of rotation of the take-off wheel is W, and the two wheels are so arranged that they are spaced ninety degrees in space phase. The two Scotch yokes are coupled together in such a manner that this relationship is preserved as the relative values of the components are changed. Thus the following relationships are maintained as a given value of is inserted into the system:

North-south component $= W \cos \phi$
East-west component $= W \sin \phi$

The coordinates of a point with reference to the fixed station may therefore be obtained by taking the summation of the above equations after integration with respect to time between the limits $t_0$ and $t$.

The means for securing the required integration is to be described in connection with the actual device and is shown in Figures 3 and 6.

Slant range may be inserted into the problem by adding altitude information and solving the resultant right triangle of ground range $r$, altitude, L, to get the slant range, R, according to a previously given formula.

To consider a more general problem, wherein both the observer station and the target are moving, we find that the problem becomes more complicated, but the same equipment will suffice.

Let us define the angle $a$ as the relative bearing of the target with respect to the keel line of the ship or airplane which serves as the mobile observing station. Then, if K represents the radar set installed on a plane or ship whose velocity is V and course A represents a target whose velocity is W and whose course is $\phi$ the equations for $r$, $\theta$, and $\beta$ become:

$$r = \sqrt{\left[X_0 + \int_{t_0}^{t}(W\cos\phi - V\cos\beta)dt\right]^2 + \left[Y_0 + \int_{t_0}^{t}(W\sin\phi - V\sin\beta)dt\right]^2}$$

and $$\theta = \tan^{-1}\left\{\frac{X_0 + \int_{t_0}^{t}(W\cos\phi - V\cos\beta)dt}{Y_0 + \int_{t_0}^{t}(W\sin\phi - V\sin\beta)dt}\right\}$$

also $$a = \phi - \theta$$

Since these equations introduce only additional functions, the same basic schemes may be used to solve this problem, but since a difference of two functions is involved, it is necessary to supply a second vector splitter as shown in Fig. 1, whose output is subtracted differentially from the first vector splitter to insert the information concerning the moving observer station.

To enable a clearer understanding of the function of the invention a brief description of a suitable embodiment in a training set will be made. This description taken with the several drawings will make the various embodiments of the invention understandable.

Figure 1 serves to illustrate the portion of the invention whose purpose is the development of shaft rotations proportional to the X and Y components of the motion of the artificial target.

Figure 2 serves to illustrate a feature of operation of this portion of the invention.

Figure 1:
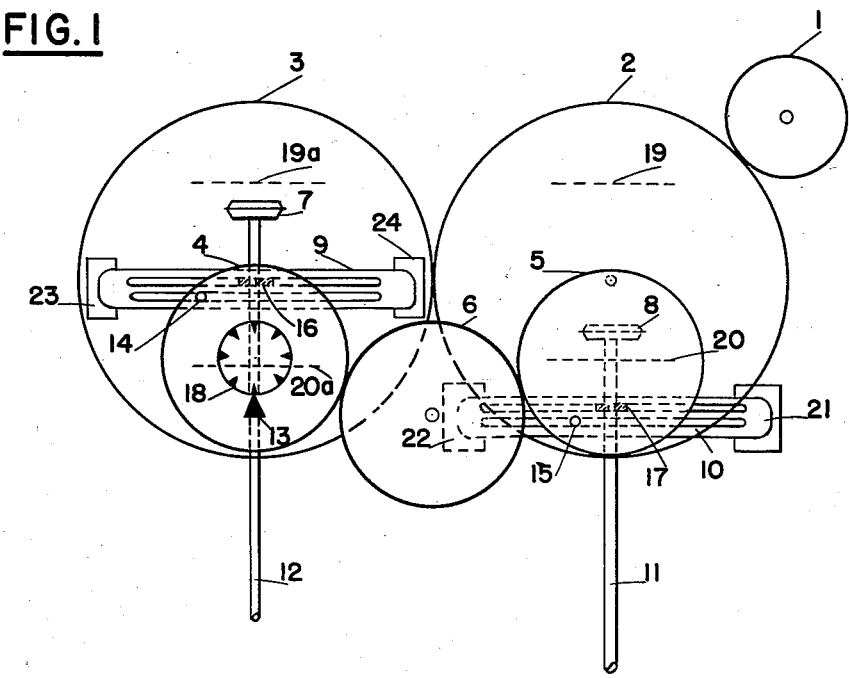

Referring specifically to Figure 1 there is shown disk 1 driven by an adjustable speed motor turning disks 2 and 3 by means of friction drive, disks 2 and 3 of the same diameter and coplanar with disk 1, wheels 7 and 8 rolling on disks 3 and 2 respectively and connected to and turning shafts 12 and 11 which constitute the output coupling from the device. Collars 16 and 17 are secured to shafts 12 and 11 in such a manner that they are free to rotate but not free to slide along their respective shafts. Disks 4 and 5 are of the same diameter. They are adjustable in rotational position and turned together by friction drive through idler disk 6. Whenever friction drive is mentioned it is understood that any suitable driving method may be employed which will provide the satisfactory speed ratio between the several components.

Pins 14 and 15 are mounted to project perpendicularly downward from disks 4 and 5. The collars and pins are free to slide in the appropriate slot of guides 9 and 10, which are mounted perpendicularly to shafts 11 and 12 and in such a manner that they are free to translate only along the direction of the axis of these shafts.

Shafts 12 and 11 may be parallel and are herein described as such. Guide pieces 21, 22, 23 and 24 are governed by suitable means to maintain the described positions of guides 9 and 10 and to that end they are properly constructed. By turning disk 4 at a uniform rate pin 14 will cause guide 9 and hence collar 16, shaft 12, and wheel 7 to move back and forth along the direction of shaft 12 in simple harmonic motion. The same will occur with wheel 8 and its associated parts in the same manner as described in connection with wheel 7.

Assuming disks 3 and 2 to be turning at a constant rate it follows that the speed at which wheels 7 and 8 rotate will vary as a simple harmonic function with constant turning of disks 4 and 5.

According to a feature of the invention the relative angular positions of pins 14 and 15 are adjusted such that they are 90° apart with respect to the axes of disks 4 and 5. That is, when pin 14 is directly above the center of shaft 12, pin 15 will be centered along the line perpendicular to the center line of shaft 11 and passing through the axis of rotation of disk 5. This will cause the simple harmonic or sinusoidal variations in speed of rotation of wheel 7 and 8 to occur with a phase displacement of 90°. Dotted lines 19 and 20 and the two correspondingly positioned lines 19a and 20a associated with the combination comprising disk 3 and associated parts indicate the limit of motion of wheels 8 and 7. To cause lines 19 and 20 for example to be at equal distances from the center of disk 2, the rotational axis of disk 5 must be displaced the correct distance from the rotational axis of disk 2, along the axis of shaft 11. This distance is readily calculated from the dimensions of the component parts. The same applies to the relative positions of disks 3 and 4.

Figure 2:
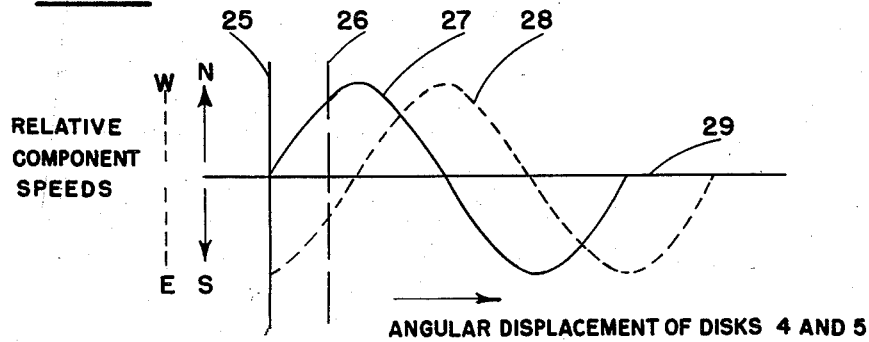

Figure 2 illustrates the manner in which the rotational speeds of shafts 12 and 11 vary with angular displacement of disks 4 and 5. The starting or reference angle indicated by the line 25 may correspond to the case where pin 14 is in the extreme left position and 15 is in the extreme lower position. Line 26 indicates, by its intercepts with curves 27 and 28, the relative speeds of shafts 12 and 11 respectively, corresponding approximately to the instantaneous positions of the moving elements as drawn in Figure 1. Curves 27 and 28 are plots of the speed variations of wheels 4 and 5 respectively.

It is clear that the vector addition of the ordinates of curves 27 and 28 for any given angular displacement of disks 4 and 5 will always result in a constant amplitude vector but of varying phase position. The manner in which this vector addition is accomplished in the trainer set will be described subsequently. Suffice it to say at present that a fixed calibrated marker disk 18 and a pointer 13 which is attached to disk 4 are used to indicate the angular position of the resultant vector speed of the speeds of shafts 11 and 12. The magnitude of this vector may be varied by varying the rotational speed of disk 1.

Figure 3:
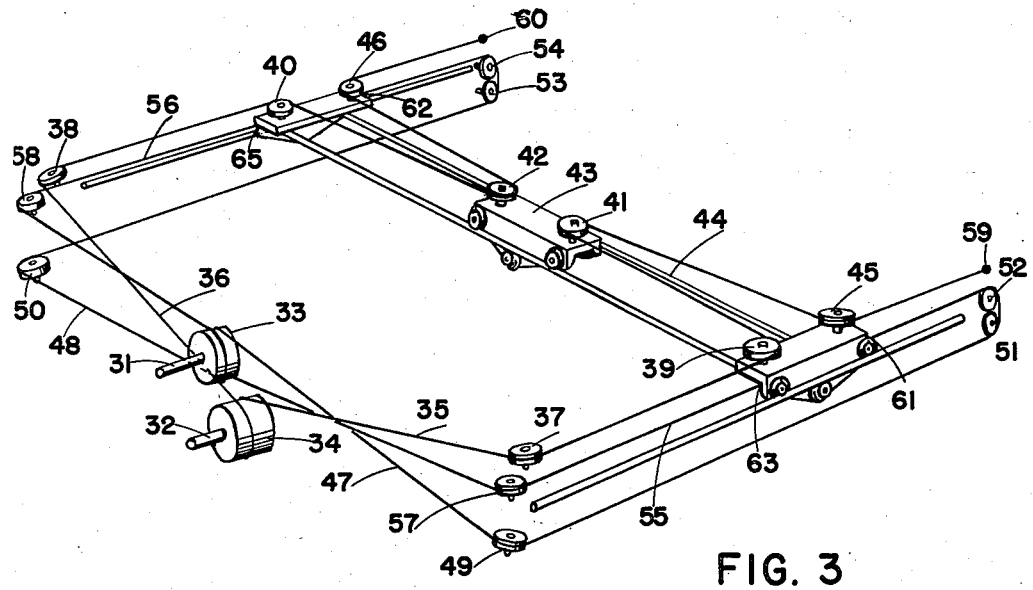
Figure 3 shows a view of a portion of the invention which constitutes the means for translating the rotational motion developed by the device of Figure 1 to a motion in orthogonal coordinates of a carriage to produce the motion corresponding to the course and speed information manually inserted into the system.

In Figure 3 there is shown the portion of the invention which performs a function of transcribing the shaft rotation developed at shafts 11 and 12 into motion in a horizontal plane of a carriage. In this figure there is therefore shown, shafts 31 and 32 turned by shafts 11 and 12 respectively, shown in Figure 1, shaft 31 being arbitrarily designated herein as the north-south shaft and 32 as the east-west shaft. 33 and 34 are pulleys connected rigidly to shafts 31 and 32 respectively. 35 and 36 are parts of the same cord, one turn of which is taken about pulley 34. Cords 35 and 36 pass around pulley 37 and 38 respectively and then over pulleys 39 and 40 and over 41 and 42 on carriage 43, which is free to roll on movable track 44. From pulleys 41 and 42, the cords go to pulleys 45 and 46 respectively and are secured to the frame at 59 and 60.

About pulley 33 there are taken one or more turns of each of two cords. One of these cords, parts of which are represented by 47 and 55, is attached to the movable track 44 at 63, passes therefrom over pulley 57, over pulley 33, thence over pulley 49 and double pulleys 51 and 52 and is secured to track 44 at 61.

Similarly, the second cord, parts of which are represented by 48 and 56 pass from the movable track at 65, over pulley 58, over pulley 33, thence over pulley 50 and double pulleys 53 and 54 and is secured to track 44 at 62.

Figure 4:
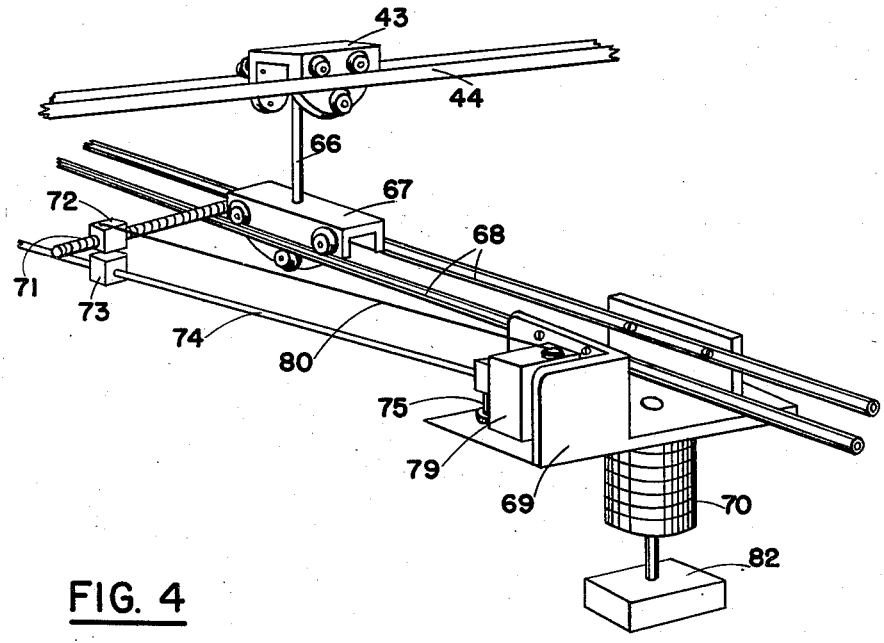
Figure 4 is an enlarged perspective view of the carriage and the equipment therewith associated for obtaining range and azimuth voltages for application to an indicator tube.

Referring now to Figure 4 a rigid spindle 66 connects the carriage 43 with a range and altitude carriage 67 which moves on track 68 which is attached to a supporting bracket 69 which rotates about a central station 70.

Since the range and altitude carriage 67 must move with the carriage 43, it rolls along the track and causes rotation about the central station 70 as the carriage is moved by the attached cords.

Mounted on the range and altitude carriage 67 is the elevation lead screw 71 and associated threaded upper block 72 and a lower block 73 which serves as a bearing for the slant range rod 74 which is fastened at one end to a pivot shaft 75 on the central station mounting bracket 69.

Figure 5:
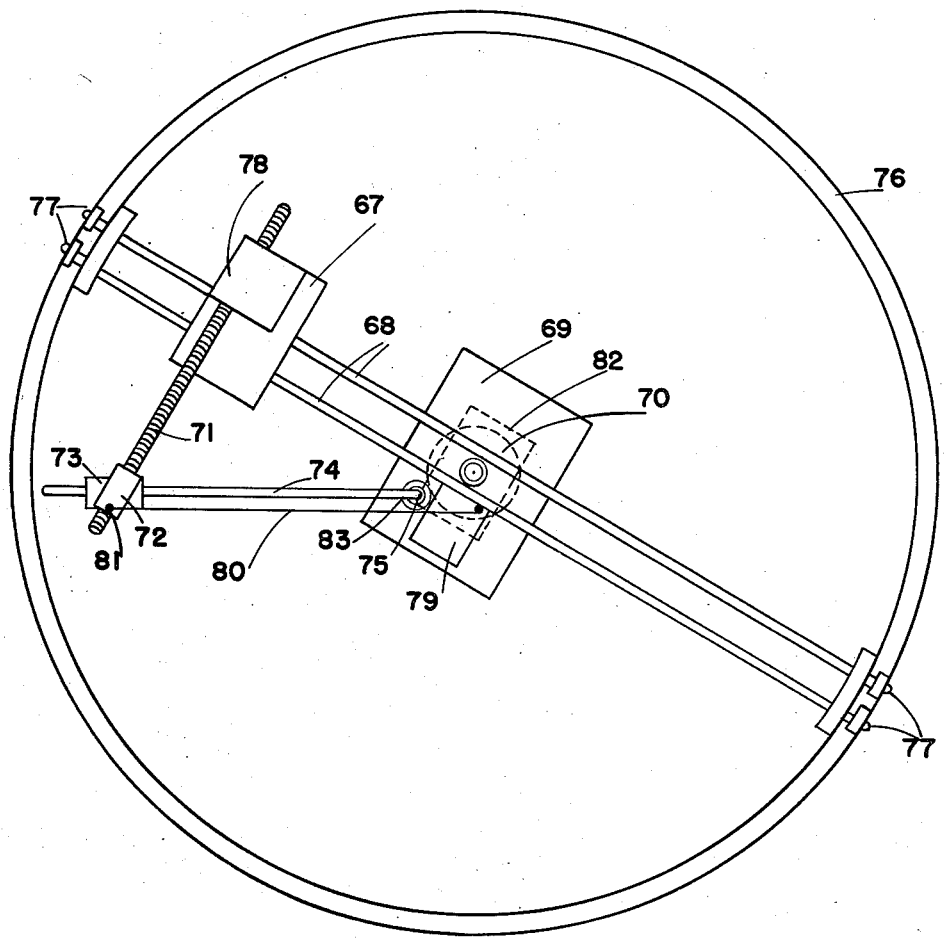
Figure 5 is a plan view of this portion of the device.

Referring now to Figure 5 there is shown a plan view of the portion of the invention shown in Figure 4. Shown therein is the large circular track 76 on which the rotating tracks 68 turn on rollers 77. On this track is the range and altitude carriage 67 on which is mounted the rate of climb motor 78. The speed of this motor is proportional to the rate of climb and is controlled by the instructor. Its shaft is the elevation lead screw 71 as described in connection with Figure 4. The slant range rod 74 is connected at the central station to the pivot shaft 75 which is directly coupled to the elevation potentiometer 83. Mounted on the central station supporting bracket 69 is slant range Selsyn 79 the shaft of which has a pulley mounted thereon with a cord 80 wrapped around it. The end of this cord is attached to the upper block 72 at 81. Selsyn 79 has a spring-loaded rotor attachment so that it automatically reels in all slack cord, making the outstanding cord at any instant proportional to the slant range. Directly coupled to the rotating central station 70 is the azimuth Selsyn 82.

Figure 6:
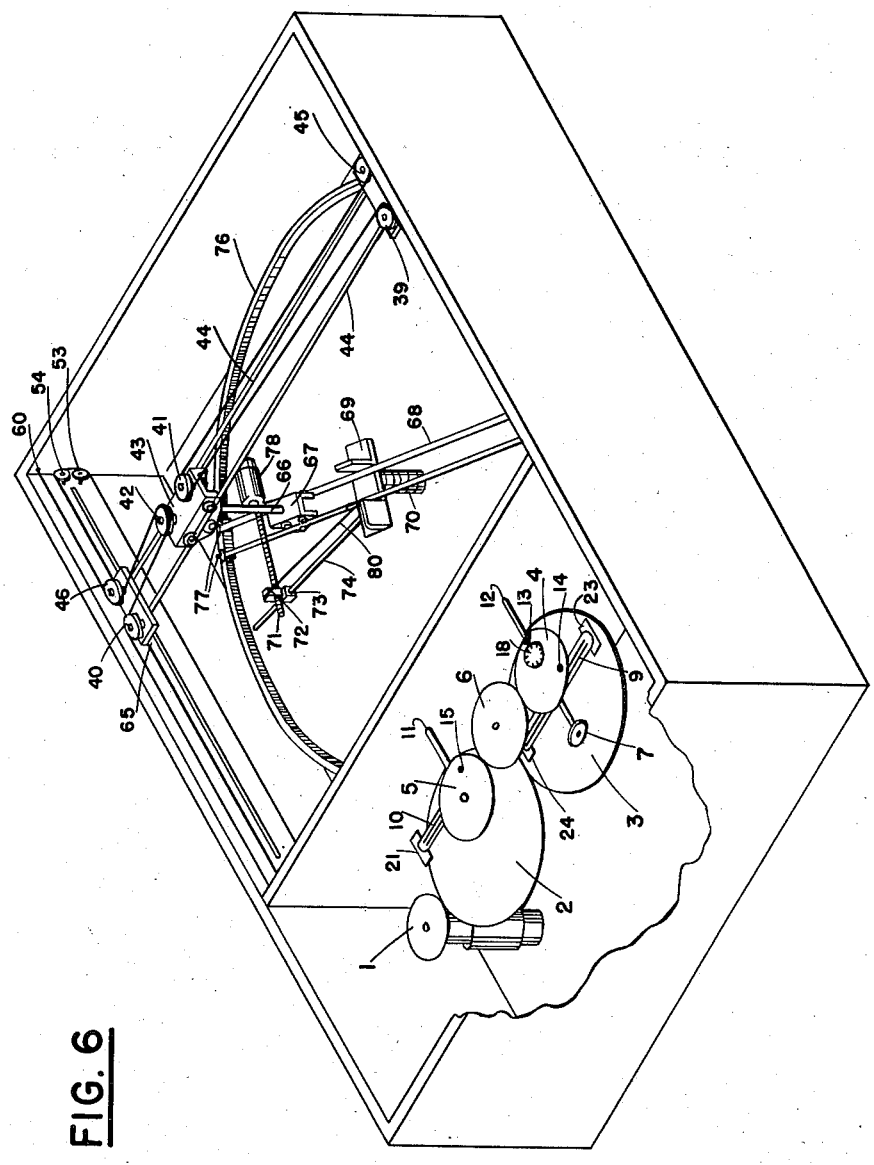
Figure 6 is a general view of the invention as a whole showing its application to the radar training set.

Figure 6 shows a general view of the entire invention.

Reviewing the operation of the system as a whole there is supplied a disk 1 driven by a variable speed motor which in turn drives a disk 2 and therefrom a disk 3 identical to disk 2. Disks 2 and 3 are also coplanar with disk 1. Wheels 7 and 8 roll on disks 3 and 2 respectively and are connected to and turn shafts 12 and 11. The speed of shafts 12 and 11 is varied by varying the position of wheels 7 and 8 on disks 3 and 2. The instructor inserts course information into the device by rotating disk 4 to a predetermined course as indicated by course indicator 18 on disk 4. Disk 5 is driven through disk 6 by disk 4 thus moving rollers 7 and 8 radially on wheels 2 and 3 by causing carriages 9 and 10 to be moved due to the rotation of wheels 4 and 5. The instructor inserts speed information by varying the speed of the motor driving disk 1.

Mounted on shafts 11 and 12 are pulleys 33 and 34. Pulley 34 has taken about it one turn of a cord, the segments of which are 35 and 36. Segment 35 passes over pulley 37 thence over pulleys 39, 41, and 45, and is permanently affixed to the frame at 59. When pulley 34 turns counterclockwise, slack is taken up from segment 35 and since segment 36 correspondingly passes over pulleys 38, 40, 42, 46 and is affixed to the frame at 60, slack is given up to segment 36. It is necessary, therefore, that carriage 43 move in the direction of the side on which the slack is being taken up and away from the other side. In our case slack is being taken up on segment 35. Therefore, carriage 43 will move along the track 44 toward the end of the track nearest pulley 45. Similarly about pulley 33 there are taken one or more turns each of two cords. The upper segment of one of these cords thence passes over pulley 58 and is fixed to the movable track carriage at 65. The other segment of this cord 48, passes over pulley 50 and thence over another pulley 53 and 54 and is permanently secured to the movable track carriage at point 62. When the pulley 33 turns clockwise, for example, slack is given up on segment 48 and taken up on the other segment, and since the other side of the carriage, which is moved by cord segment 55, is also looped about pulley 33 and similarly moved, the movable track carriage must move toward the pulleys, since the slack is being taken up in this direction. If the direction of rotation were reversed the carriage would move away from the pulleys 33 and 34 toward the far end of the track. As the carriage 43 is moved through space the range and altitude carriage which is pivoted on spindle 66 must move similarly. It, therefore, rolls along tracks 68 and pivots the rotatable track on rollers 77 which ride on circular track 76. This rotation is recorded by the azimuth Selsyn 82, which records the azimuth of the artificial target. The distance from the fixed central station 70 to the position of the threaded upper block 72 is recorded by the slant range Selsyn 79 which is rotated by string 80 affixed to the upper block 72, riding on threaded spindle 71, which is driven by the rate of climb motor 78 mounted on range and azimuth carriage 67. The speed of this motor is controlled by the instructor to insert a desired rate of climb. The string 80 automatically becomes the hypotenuse of a right triangle the legs of which are the length of the track 68 between the range and altitude carriage 67 and the fixed central station 70, and the length of elevation lead screw 71 between the range and altitude carriage and upper block 72. The angle of elevation of the target may be taken by means of rod 74 which rides through a lower block 73 pivoted on upper block 72 and attached at the other end to a pivot shaft 75, which is coupled to the elevation angle potentiometer 83. There is thus developed, at the azimuth Selsyn 82, the azimuth information of the target. There is developed at slant range Selsyn 79 the range information of the artificial target and at elevation potentiometer 83 the elevation angle information of the target.

These voltages are applied to an indicator tube to move a target in accordance with the information inserted.

It is to be understood that, while I have limited myself to description of my invention in connection with certain preferred embodiments, I do not desire to limit the scope of my invention except as it may be limited by the scope of the appended claims.

Having described my invention, I claim:

1. In a trainer of the class described, mechanism for integrating course and speed values and comprising: a pair of shafts intended to be rotated at different velocities corresponding to said values, a variable speed driving member, a pair of large disks driven at the same speed by said driving member, said shafts being axially shiftable and carrying integral wheels peripherally contacting the sides of said disks to be driven thereby at speeds corresponding to the distances from their contact points to the centers of disk rotation, manually rotatable means and Scotch yoke interconnections between said shafts and said manually rotatable means to simultaneously vary the radial position of said wheels on said discs in accordance with the angular position of said manually rotatable means.

2. In the combination of claim 1, said yoke interconnections comprising two wheels of like size and in engagement with a third wheel and hence rotatable at the same speed but being relatively adjustable angularly, a pair of slotted members adjacent said two wheels, the latter having pins received in certain slots of said members, and elements on said shafts freely received in certain other slots of said members.

MARCEL E. DROZ.

REFERENCES CITED

The following references are of record in the file of this patent:

UNITED STATES PATENTS

| Number | Name | Date |
|---|---|---|
| 536,530 | Jordan | Mar. 26, 1895 |
| 2,049,821 | Nystrom | Aug. 4, 1936 |
| 2,224,182 | Crooke | Dec. 10, 1940 |
| 2,328,501 | Schanzer | Aug. 31, 1945 |
| 2,396,857 | Kittredge | Mar. 19, 1946 |
| 2,481,039 | Ross | Sept. 6, 1946 |

FOREIGN PATENTS

| Number | Country | Date |
|---|---|---|
| 631,795 | Germany | July 1, 1936 |